(12) United States Patent
Livingston et al.

(10) Patent No.: US 11,117,004 B2
(45) Date of Patent: Sep. 14, 2021

(54) FIRE SEAL END CAP AND ASSOCIATED MULTI-MEMBER ASSEMBLY AND METHOD

(71) Applicant: The Boeing Company, Chicago, IL (US)

(72) Inventors: Scott M. Livingston, Seattle, WA (US); Jack W. Mauldin, Mill Creek, WA (US); Robert P. Lotter, Mill Creek, WA (US); Paul B. Philipp, Woodinville, WA (US); Khalid S. Alshobber, Seattle, WA (US); John N. Harris, Seattle, WA (US)

(73) Assignee: The Boeing Company, Chicago, IL (US)

( * ) Notice: Subject to any disclaimer, the term of this patent is extended or adjusted under 35 U.S.C. 154(b) by 182 days.

(21) Appl. No.: 15/860,791

(22) Filed: Jan. 3, 2018

(65) Prior Publication Data

US 2018/0140878 A1 May 24, 2018

Related U.S. Application Data

(62) Division of application No. 13/975,797, filed on Aug. 26, 2013, now Pat. No. 9,889,323.

(Continued)

(51) Int. Cl.
| | |
|---|---|
| A62C 3/08 | (2006.01) |
| B64D 27/00 | (2006.01) |
| B64D 45/00 | (2006.01) |
| F16J 15/02 | (2006.01) |
| F16J 15/06 | (2006.01) |
| B64C 1/10 | (2006.01) |
| B64C 1/16 | (2006.01) |
| A62C 2/06 | (2006.01) |

(Continued)

(52) U.S. Cl.
CPC ............... *A62C 3/08* (2013.01); *A62C 2/06* (2013.01); *A62C 99/009* (2013.01); *B64C 1/10* (2013.01); *B64C 1/16* (2013.01); *B64D 27/00* (2013.01); *B64D 45/00* (2013.01); *F02K 1/78* (2013.01); *F16J 15/027* (2013.01); *F16J 15/065* (2013.01); *B64D 2045/009* (2013.01); *F16L 55/10* (2013.01); *F16L 55/1026* (2013.01)

(58) Field of Classification Search
CPC ........... A62C 3/08; A62C 99/009; A62C 2/06; F02K 1/78; B64C 1/16; B64C 1/10; F16J 15/065; B64D 45/00; B64D 27/00; B64D 2045/00; F16L 55/1026; F16L 55/10
USPC .............................. 220/88.2; 244/121, 129.2
See application file for complete search history.

(56) References Cited

U.S. PATENT DOCUMENTS

| | | | | |
|---|---|---|---|---|
| 5,458,343 A | * | 10/1995 | Dornfeld | F16L 5/08 277/503 |
| 6,435,824 B1 | * | 8/2002 | Schell | F01D 11/122 415/174.4 |

(Continued)

FOREIGN PATENT DOCUMENTS

| | | | | |
|---|---|---|---|---|
| GB | 2256465 | * | 12/1992 | F16L 55/10 |
| JP | 2008-249156 | * | 10/2008 | F23L 15/00 |
| WO | WO2006000781 | * | 1/2006 | F16J 15/02 |

*Primary Examiner* — Qingzhang Zhou
(74) *Attorney, Agent, or Firm* — Walters & Wasylyna LLC

(57) ABSTRACT

A fire seal end cap including a cap portion and a plug portion, wherein the plug portion protrudes from the cap portion, and wherein the cap portion and the plug portion are formed from a fire-resistant material.

20 Claims, 13 Drawing Sheets

Related U.S. Application Data

(60) Provisional application No. 61/779,898, filed on Mar. 13, 2013.

(51) Int. Cl.
*A62C 99/00* (2010.01)
*F02K 1/78* (2006.01)
*F16L 55/10* (2006.01)

(56) References Cited

U.S. PATENT DOCUMENTS

| | | | |
|---|---|---|---|
| 7,105,047 B2 * | 9/2006 | Simmons | C04B 28/26 |
| | | | 106/600 |
| 2010/0173109 A1 * | 7/2010 | Okabe | B32B 1/08 |
| | | | 428/36.91 |
| 2011/0272890 A1 * | 11/2011 | Selby | F16J 15/3272 |
| | | | 277/345 |
| 2012/0104162 A1 * | 5/2012 | West | B64C 1/1453 |
| | | | 244/54 |
| 2012/0261157 A1 * | 10/2012 | Hepfinger | H02G 9/065 |
| | | | 174/95 |

* cited by examiner

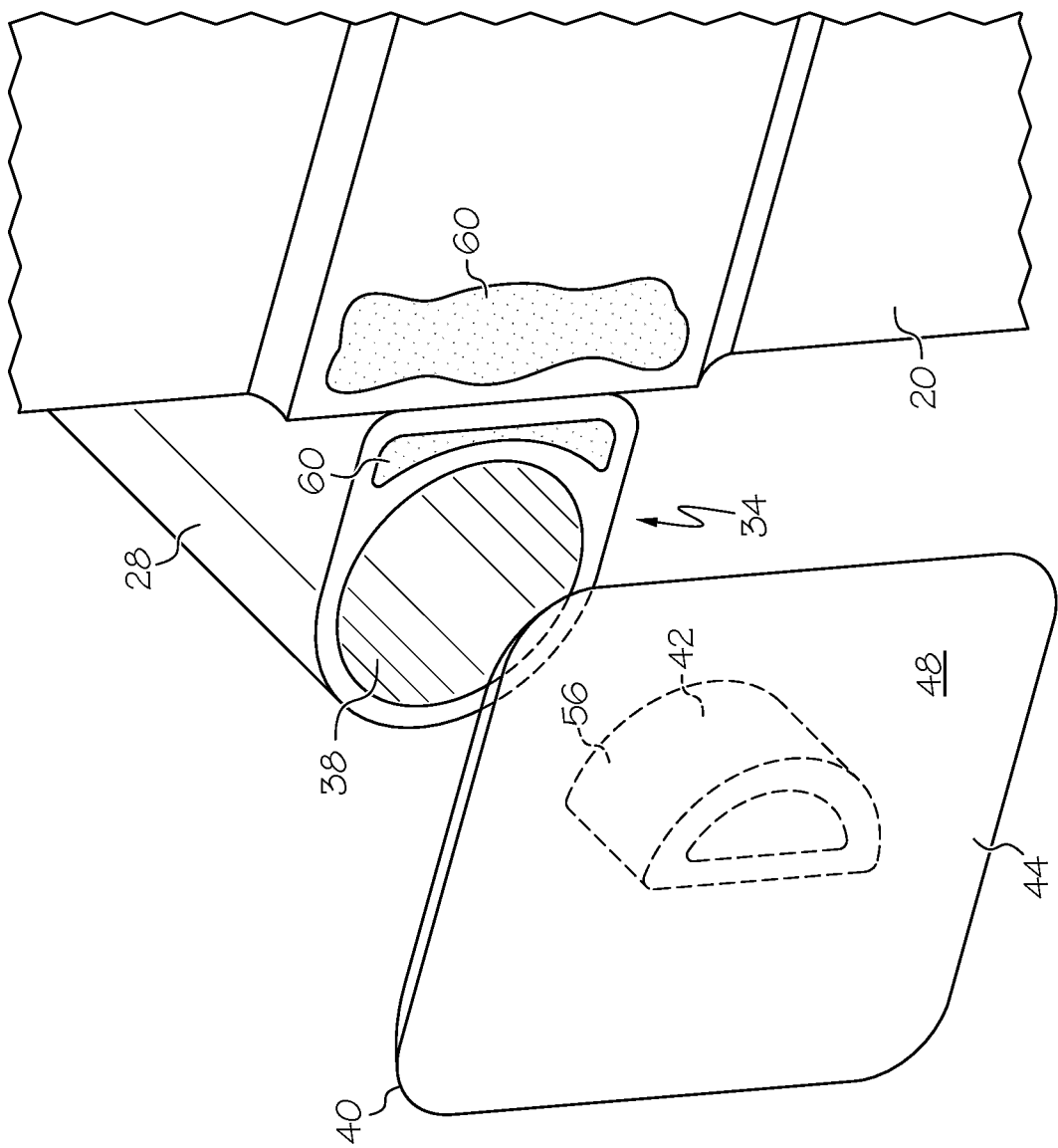

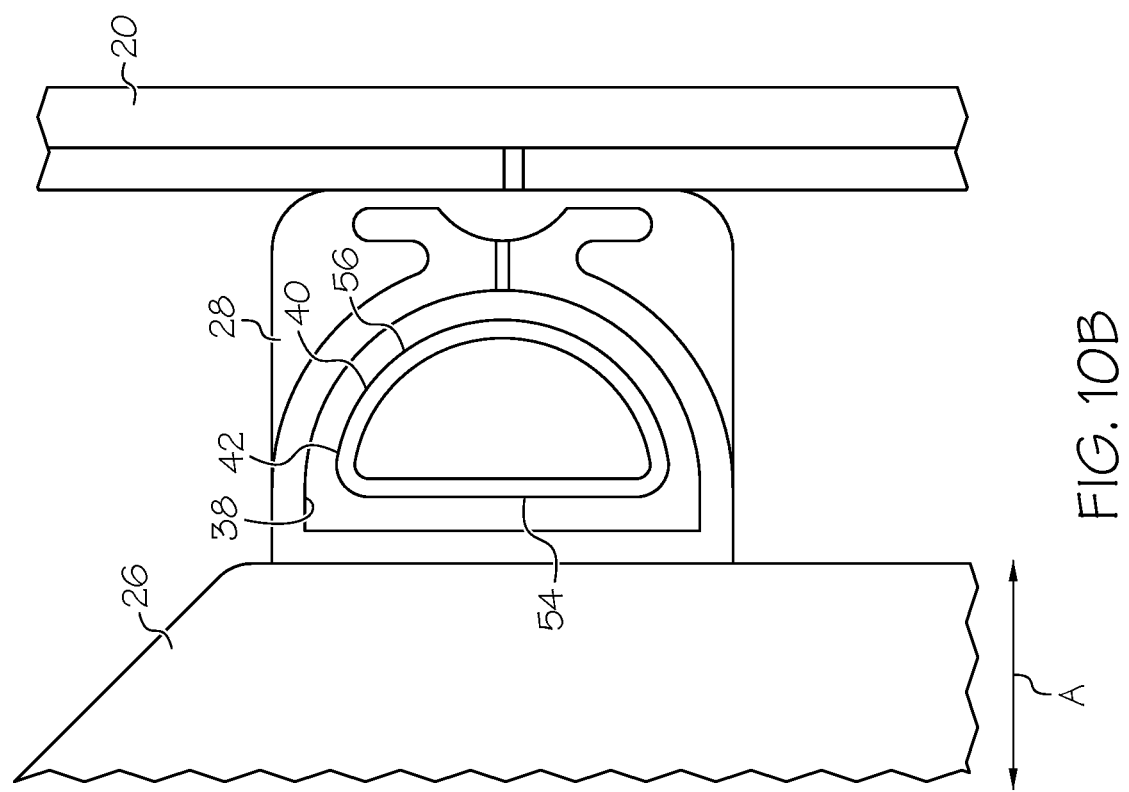

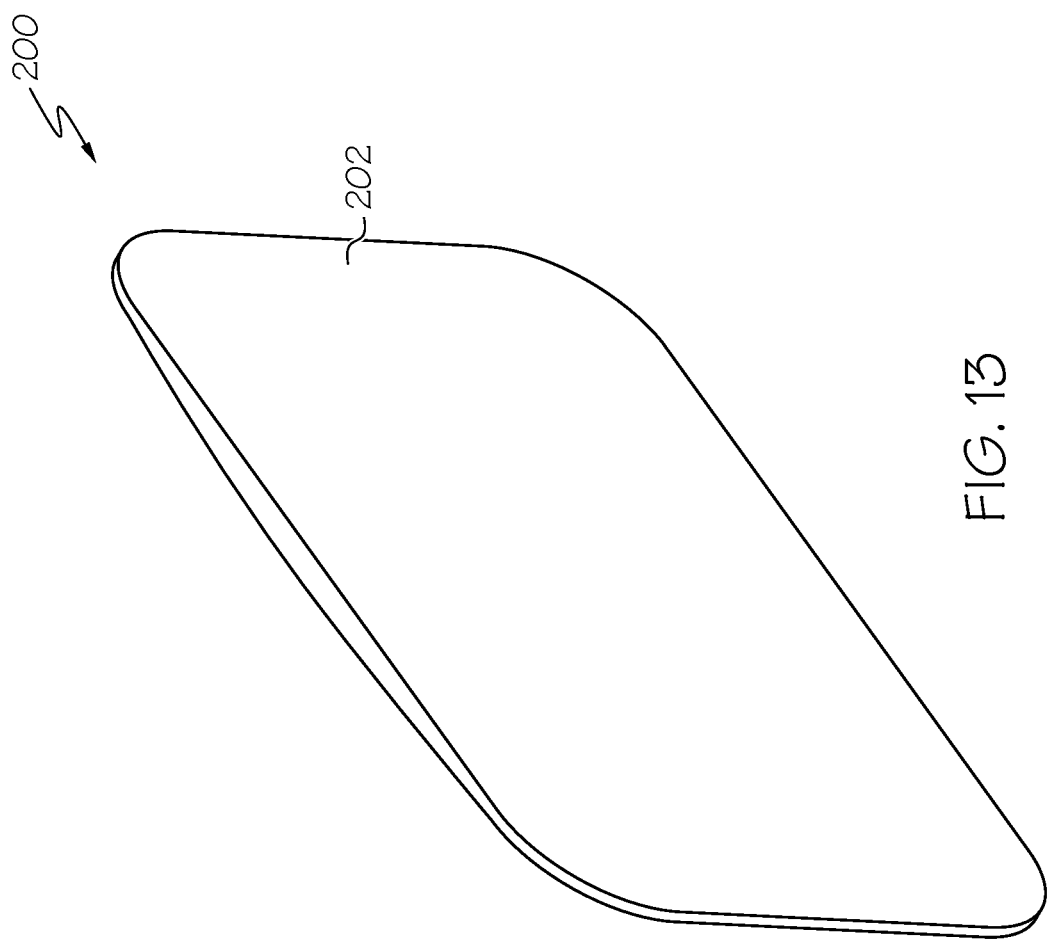

FIRE SEAL END CAP AND ASSOCIATED MULTI-MEMBER ASSEMBLY AND METHOD

PRIORITY

This application is a divisional of U.S. Ser. No. 13/975,797 filed on Aug. 26, 2013, which is a non-provisional of U.S. Ser. No. 61/779,898 filed on Mar. 13, 2013.

FIELD

This application relates to fire barriers and, more particularly, to apparatus and methods for establishing a fire seal that eliminates (or at least reduces) gaps.

BACKGROUND

Aircraft engines are typically housed in a nacelle. A pylon extends from the nacelle to couple the engine to the aircraft. As one example, the pylon may couple the engine to a wing of the aircraft (e.g., the engine may be suspended below the wing). As another example, the pylon may couple the engine directly to the fuselage of the aircraft (e.g., the engine may be mounted to the side of the fuselage proximate the rear of the fuselage).

In modern aircraft, various steps are taken to inhibit the spread of flames to the wings and fuselage of the aircraft in the event of an engine fire. For example, all structural interfaces within the engine/pylon assembly are sealed with fireproof (or fire-resistant) material to eliminate gaps through which flames may propagate.

Structural interfaces vary with manufacturing tolerances and many are dynamic and, thus, are difficult to seal. For example, the interface between the forward side of the pylon and the aft side of the engine firewall can be quite dynamic—the engine firewall moves fore/aft, side-to-side and up/down relative to the pylon. A crossover seal is often positioned between the engine firewall and the pylon to provide the necessary seal, while accommodating the movement of the engine firewall. It is convenient when arranging the seal routings for the thrust reverser fire seal to lie over the crossover seal, but such a configuration may create gaps.

Accordingly, those skilled in the art continue with research and development efforts in the field of aircraft fire barriers.

SUMMARY

In one aspect, the disclosed fire seal end cap may include a cap portion and a plug portion, wherein the plug portion protrudes from the cap portion, and wherein the cap portion and the plug portion are formed from fire-resistant material.

In another aspect, the disclosed multi-member assembly may include a first structural member, a second structural member opposed from the first structural member, a crossover seal positioned between the first and second structural members, wherein the crossover seal defines a bore, and an end cap including a cap portion and a plug portion protruding from the cap portion, wherein the plug portion is at least partially received in the bore such that the cap portion bridges the first and second structural members. Optionally, a third structural member may lie over the cap portion of the end cap.

In another aspect, the disclosed multi-member assembly may include a pylon, an engine fire wall opposed from the pylon, a crossover seal positioned between the pylon and the engine fire wall, wherein the crossover seal defines a bore, and an end cap including a cap portion and a plug portion protruding from the cap portion, wherein the plug portion is at least partially received in the bore such that the cap portion bridges the pylon and the engine fire wall. Optionally, a thrust reverser and associated thrust reverser fire seal may lie over the cap portion of the end cap.

In yet another aspect, disclosed is a fire sealing method. The method may include the steps of (1) providing a first structural member opposed from a second structural member; (2) positioning a crossover seal between the first structural member and the second structural member, wherein the crossover seal defines a bore; (3) providing an end cap including a cap portion and a plug portion protruding from the cap portion; and (4) positioning the end cap such that the plug portion is at least partially received in the bore and the cap portion bridges the first structural member and the second structural member.

Other aspects of the disclosed fire seal end cap and associated multi-member assembly and method will become apparent from the following detailed description, the accompanying drawings and the appended claims.

BRIEF DESCRIPTION OF THE DRAWINGS

FIG. 8 is a perspective view of the disclosed fire seal end cap being inserted into a crossover seal;

FIGS. 10A and 10B are side elevational views of the disclosed engine-fire-wall-to-pylon interface, showing the engine fire wall in fore (FIG. 10A) and aft (FIG. 10B) positions;

FIG. 13 is a perspective view of another aspect of the disclosed fire seal end cap.

DETAILED DESCRIPTION

Figure 1:
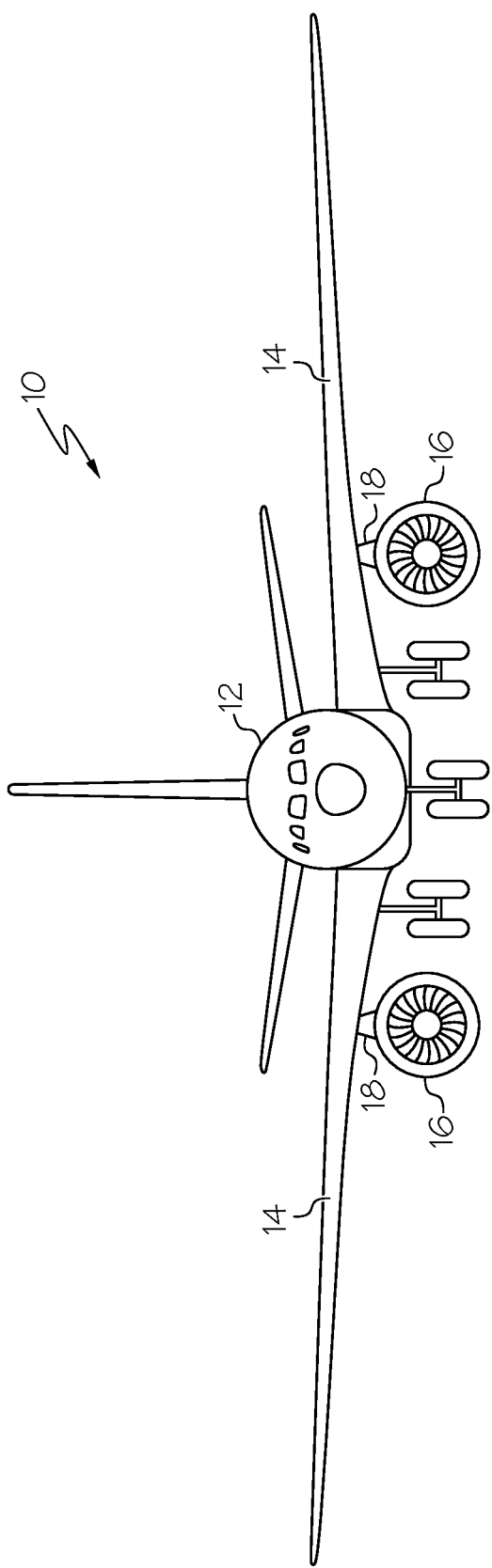
FIG. 1 is a front elevational view of an aircraft provided with the disclosed fire seal end cap.

Referring to FIG. 1, an aircraft, generally designated 10, may include a fuselage 12, wings 14, engines 16 and pylons 18. The pylons 18 may couple the engines 16 to the aircraft 10 (e.g., to the wings 14).

Figure 2A:
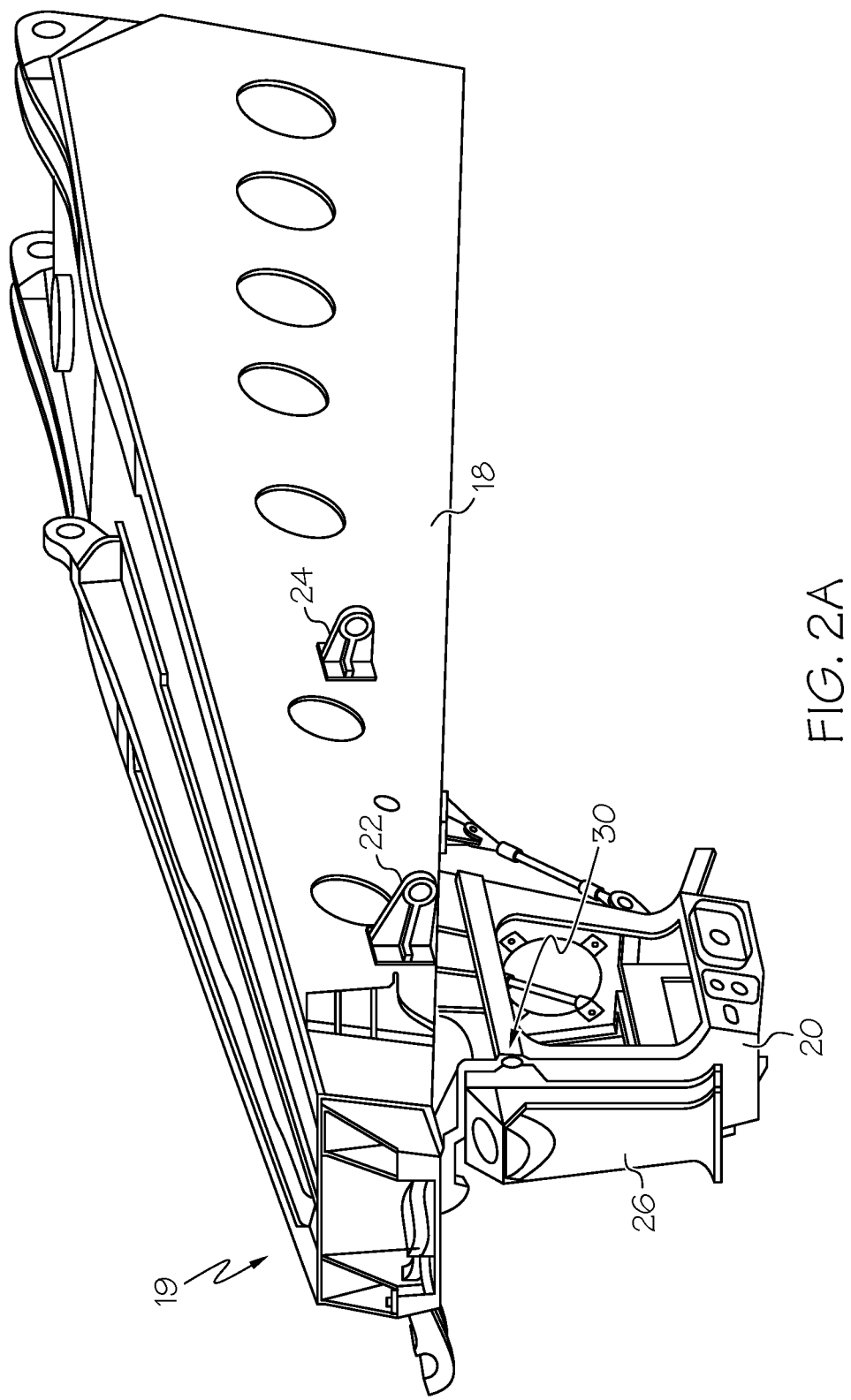
FIGS. 2A and 2B are perspective views of a pylon of the aircraft of FIG. 1, the pylon being shown with an engine fire wall interfaced with the pylon.
Figure 2B:
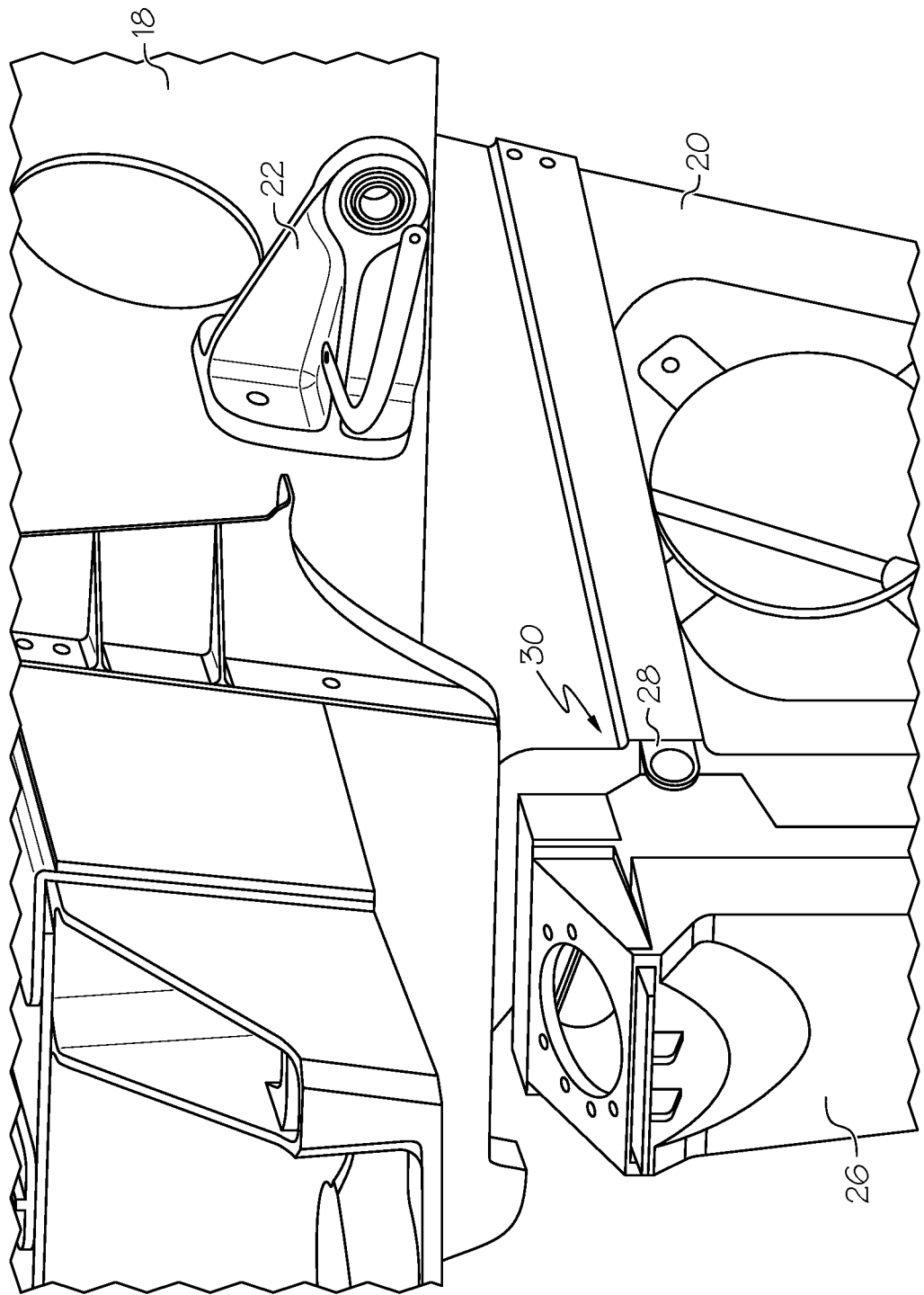

As shown in FIGS. 2A and 2B, each pylon 18 may include a strut box 20 proximate (at or near) the forward end 19 of the pylon 18. The strut box 20 may be connected to, or integral with, the pylon 18. Optionally, thrust reverser hinges 22, 24 may be connected to the pylon 18 proximate the strut box 20.

Each engine 16 (FIG. 1) may be mounted to the aircraft 10 (FIG. 1) by way of an associated pylon 18. Each engine 16 may include an engine fire wall 26. The engine fire wall 26 may be attached to the fan case (not shown) of the engine 16.

Figure 3:
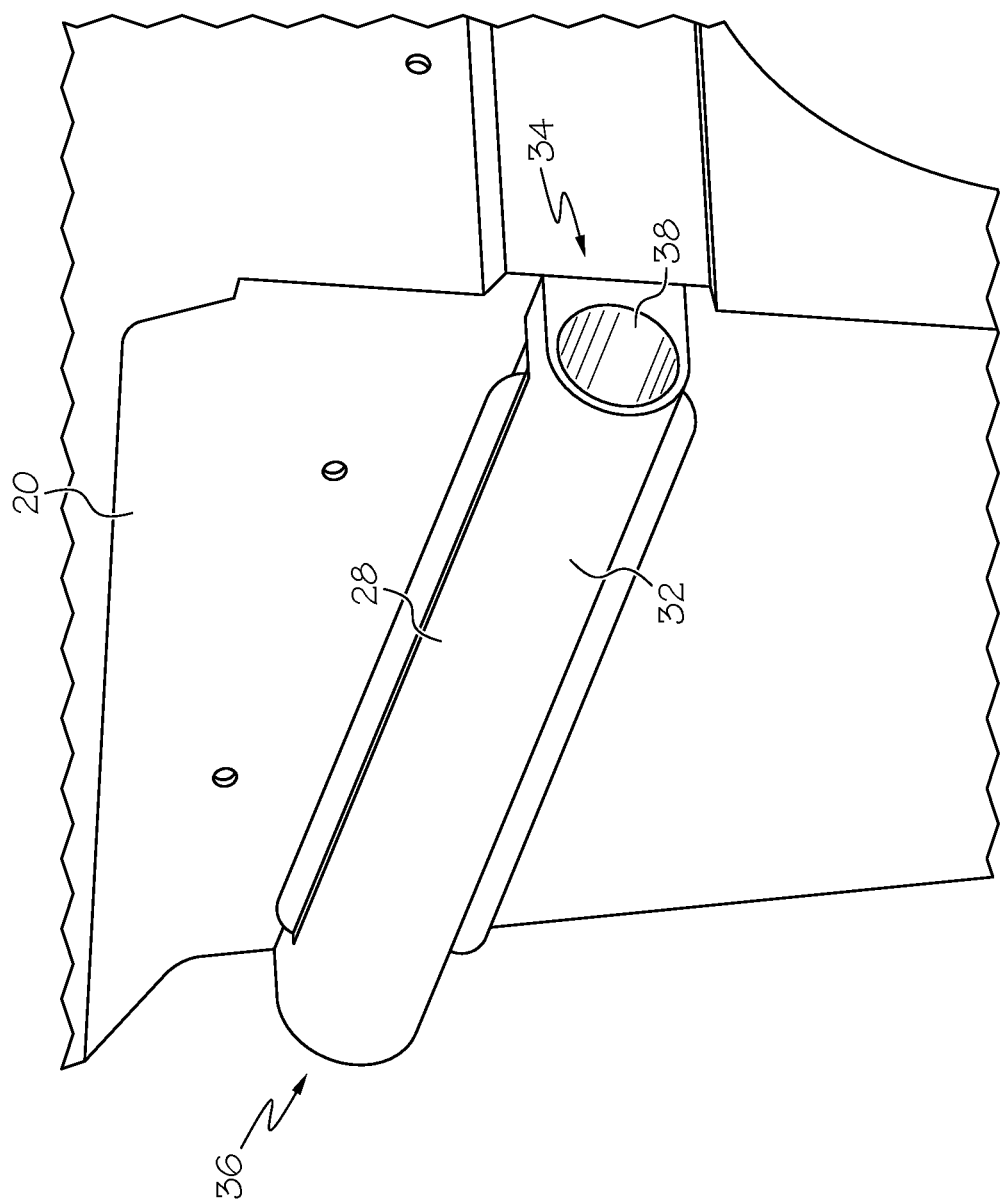
FIG. 3 is a perspective view of the pylon of FIG. 2B showing the entire length of a crossover seal.

A crossover seal 28 may be positioned at the interface 30 between the pylon 18 (a first structural member) and the engine 16 (a second structural member). In one configuration, as shown in FIG. 3, the crossover seal 28 may be connected to the strut box 20 of the pylon 18, such as with mechanical fasteners and/or adhesives (e.g., RTV106 silicone adhesive available from MG Chemicals, Ltd. of Canada). The crossover seal 28 may be in abutting engagement with, but not directly connected to, the engine fire wall 26 of the engine 16. Therefore, the crossover seal 28 may seal the interface 30 (FIG. 2B) between the strut box 20 and the engine fire wall 26 without inhibiting fore/aft, side-to-side and up/down movement of the engine fire wall 26 relative to the strut box 20. In another configuration, the crossover seal 28 may be connected to the engine fire wall 26, but not to the strut box 20.

Referring to FIG. 3, the crossover seal 28 may include an elongated body 32 that laterally extends along the strut box 20. The elongated body 32 of the crossover seal 28 may be a single monolithic body and may have a first end 34 and a second, opposite end 36. The elongated body 32 of the crossover seal 28 may define a bore 38, which may extend (continuously or not) from the first end 34 of the elongated body 32 to the second end 36 such that openings to the bore 38 are presented at the first and second ends 34, 36 of the crossover seal 28.

The crossover seal 28 may be formed from a fire-resistant material that is deformable yet resilient. Selection of a suitable fire-resistant material may allow the crossover seal 28 to inhibit flame propagation. Selection of a suitable deformable yet resilient material may allow the crossover seal 28 to deform and relax (like a bumper or boat fender) such that the crossover seal 28 maintains a seal between the engine fire wall 26 and the strut box 20 even as the engine fire wall 26 moves relative to the strut box 20. As one example, the crossover seal 28 may be formed from a silicone rubber material. As another example, the crossover seal 28 may be formed from a foamed material. As yet another example, the crossover seal 28 may be formed from a foamed silicon rubber material.

Figure 10A:
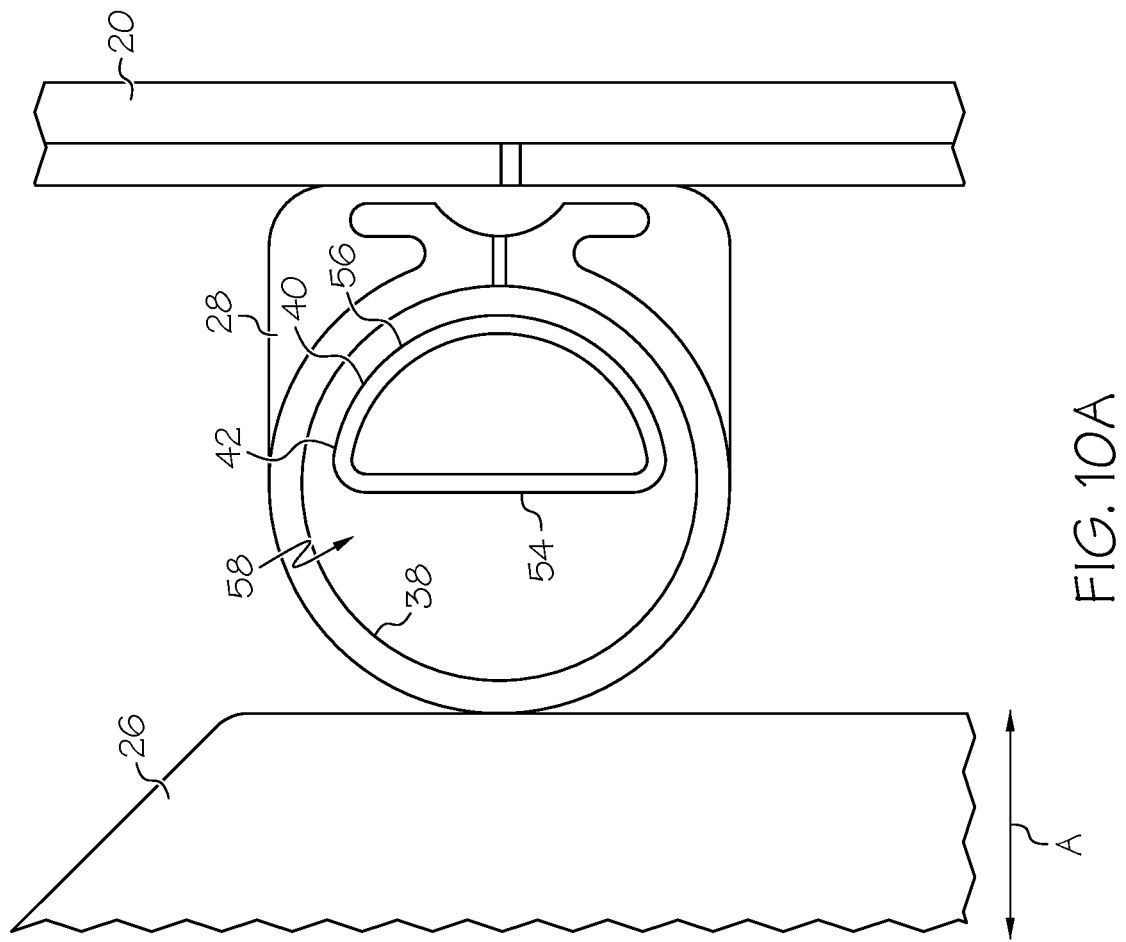

Thus, as shown in FIGS. 10A and 10B, the crossover seal 28 may deform (FIG. 10B) and relax (FIG. 10A) between the engine fire wall 26 and the strut box 20 as the engine fire wall 26 moves fore/aft (arrow A) relative to the strut box 20, thereby maintaining a seal between the engine fire wall 26 and the strut box 20. Configurations in which the crossover seal 28 is deformed in other directions (e.g., up/down or side-to-side) are also contemplated.

Figure 4:
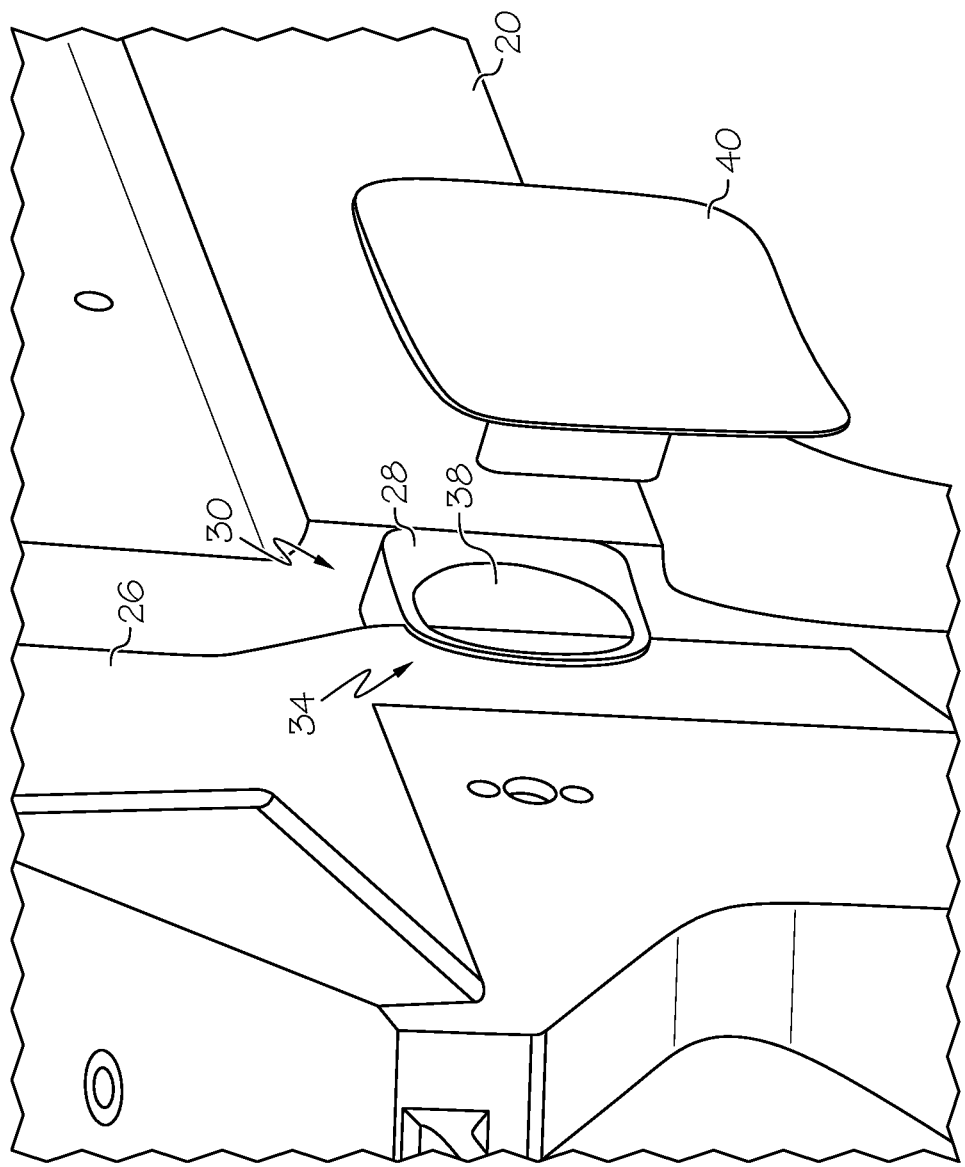
FIG. 4 is a perspective view of the engine-fire-wall-to-pylon interface shown with the disclosed fire seal end cap.

Referring to FIG. 4, the disclosed fire seal end cap 40 may be connected to the crossover seal 28, such as by inserting a portion of the fire seal end cap 40 into the bore 38 of the crossover seal 28. Therefore, the fire seal end cap 40 may overlap (e.g., loosely overlap) both the strut box 20 and the engine fire wall 26, thereby bridging the interface 30 between the strut box 20 and the engine fire wall 26 without inhibiting fore/aft, side-to-side and up/down movement of the engine fire wall 26 relative to the strut box 20.

Figure 6:
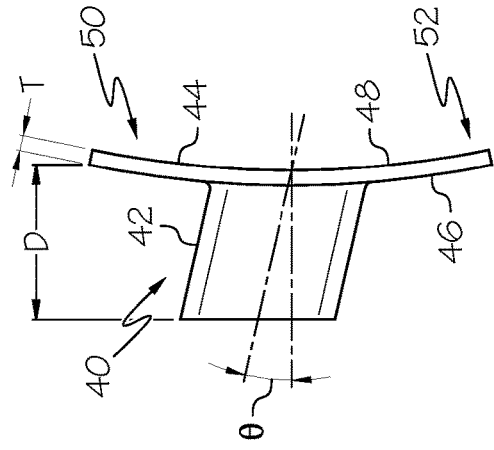
FIG. 6 is a side elevational view of the fire seal end cap of FIG. 5.
Figure 7:
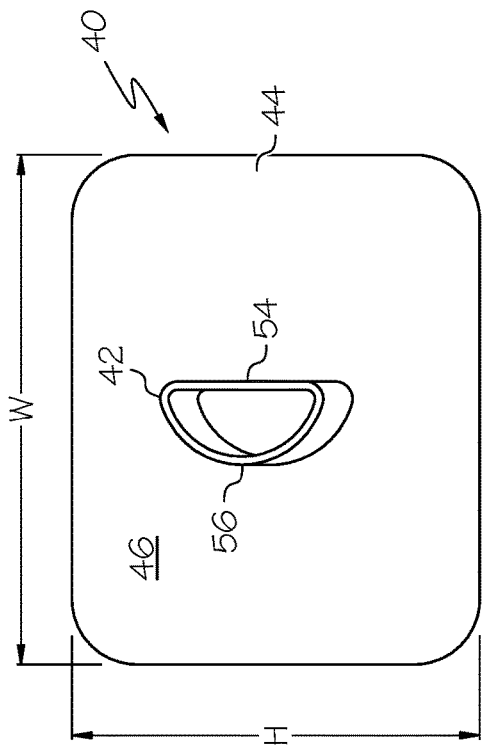
FIG. 7 is a front elevational view of the fire seal end cap of FIG. 6.
Figure 5:
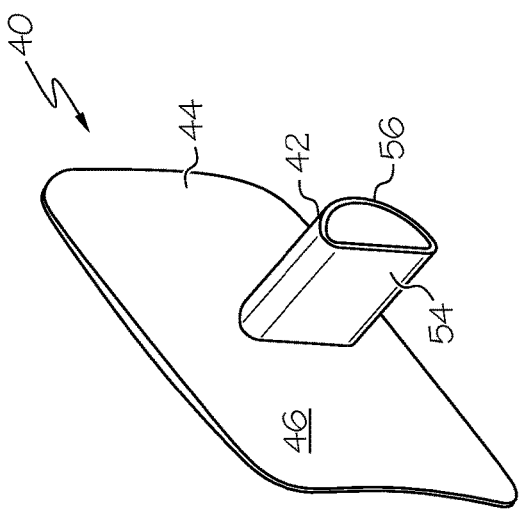
FIG. 5 is a perspective view of one aspect of the disclosed fire seal end cap.

Referring to FIGS. 5-7, the disclosed fire seal end cap 40 may include a plug portion 42 and a cap portion 44. The plug portion 42 of the fire seal end cap 40 may be inserted into the bore 38 (FIG. 4) of the crossover seal (FIG. 4) to connect the fire seal end cap 40 to the crossover seal 28 and to position the cap portion 44 of the fire seal end cap 40 to bridge the interface 30 between the strut box 20 and the engine fire wall 26.

The cap portion 44 of the end cap 40 may have a maximum lateral width W (FIG. 7) sufficient to bridge the interface 30 between the strut box 20 and the engine fire wall 26. Additionally, the cap portion 44 may have a maximum vertical height H (FIG. 7) sufficient to provide the required seal function. As one specific, non-limiting example, the lateral width W of the cap portion 44 may range from about 3 to about 5 inches (e.g., 3.75 inches) and the vertical height H of the cap portion 44 may range from about 2 to about 4 inches (e.g., 3 inches). As another specific, non-limiting example, the lateral width W of the cap portion 44 may range from about 2 to about 10 inches and the vertical height H of the cap portion 44 may range from about 1 to about 8 inches. As yet another specific, non-limiting example, the lateral width W of the cap portion 44 may range from about 1 to about 20 inches and the vertical height H of the cap portion 44 may range from about 1 to about 15 inches. These ranges are provided for illustrative purposes only—actual dimensions may depend on the specific application.

The maximum cross-sectional thickness T (FIG. 6) of the cap portion 44 may be dictated by, among other things, the types of materials used to form the end cap 40. Materials that are relatively less fire-resistant may warrant a cap portion 44 having a greater cross-sectional thickness T, while materials that are relatively more fire-resistant may facilitate using a thinner cross-sectional thickness T. As one specific, non-limiting example, the maximum cross-sectional thickness T of the cap portion 44 may range from about 0.0625 inches to about 0.25 inches, such as about 0.125 inches. As another specific, non-limiting example, the maximum cross-sectional thickness T of the cap portion 44 may range from about 0.03 inches to about 1 inch. As yet another specific, non-limiting example, the maximum cross-sectional thickness T of the cap portion 44 may range from about 0.001 inches to about 2 inches.

As shown in FIG. 5, the maximum cross-sectional thickness T of the cap portion 44 may occur proximate the center of the cap portion 44. However, the cross-sectional thickness may taper down (thin) from the center outward (e.g., from the center to the left and right in FIG. 7).

Thus, the cap portion 44 may have a first major surface 46 (FIG. 7) and a second, opposed major surface 48 (FIG. 8).

The cap portion 44 may have a generally rectilinear shape (e.g., rectangular shape) in front view. Any corners may be rounded (radiused), as best shown in FIG. 7, to eliminate sharp corners that may cause snags and the like. Additionally, as best shown in FIG. 6, the cap portion 44 may be curved (e.g., from the top edge 50 to the bottom edge 52) such that the cap portion 44 is slightly concave, thereby allowing the cap portion 44 to better conform to the contours of the surrounding structure. While a specific cap portion 44 is shown and described, those skilled in the art will appreciate that cap portions having various shapes and configurations may be used without departing from the scope of the present disclosure.

The plug portion 42 of the end cap 40 may be integral with the cap portion 44 (the plug portion 42 and the cap portion 44 may be formed as a single monolithic body). Alternatively, the plug portion 42 may be formed separately from the cap portion 44 and then later connected to the cap portion 44, such as with adhesives, mechanical fasteners and/or any other appropriate joining technique.

The plug portion 42 may protrude outward a maximum distance D (FIG. 6) from the first major surface 46 of the cap portion 44. As one specific, non-limiting example, the protruding distance D of the plug portion 42 may range from about 0.5 to about 2 inches, such as about 1 inch. However, the actual protruding distance D may depend on the specific application and other factors, such as the depth of the bore 38 (FIG. 4) in the crossover seal 28 (FIG. 4). As shown in FIG. 7, the plug portion 42 may protrude from proximate the center of the first major surface 46 of the cap portion 44, though various off-sets from center may be used depending on application.

The plug portion 42 may be substantially normal to the first major surface 46 of the cap portion 44. However, as shown in FIG. 6, the plug portion 42 may protrude at a non-zero angle θ relative to normal. As one specific, non-limiting example, the angle θ may range from about 1 to about 20 degrees.

Optionally, the plug portion 42 of the end cap 40 may be shaped to accommodate deformation/compression of the crossover seal 28 when the plug portion 42 is received in the bore 38 of the crossover seal, as shown in FIGS. 10A and 10B. The particular shape of the plug portion 42, particularly the cross-sectional shape in front view, may be dictated by, among other things, the shape of the bore 38 defined by the crossover seal 28.

In one particular implementation, the plug portion 42 of the end cap 40 may have a generally hemispherical (or D-shaped) cross-section in front view. Specifically, referring to FIGS. 5, 7, 10A and 10B, the plug portion 42 may include a substantially flat forward end 54 and a curved rear end 56. The curved rear end 56 of the plug portion 42 may closely correspond to the contour of the bore 38 of the crossover seal 28. The substantially flat forward end 54 of the plug portion 42 may define a gap 58 (FIG. 10A) between the crossover seal 28 and the plug portion 42 such that the plug portion 42 of the end cap 40 does not interfere with compression (FIG. 10B) of the crossover seal 28 by the engine fire wall 26.

The fire seal end cap 40 may be formed from various fire-resistant materials or combination of materials. Suitable fire-resistant materials (or combinations) may render the end cap 40 substantially stiff yet pliable such that the end cap 40 generally maintains its shape but conforms to the surrounding structure. Therefore, the end cap 40 may be self-adjusting to accommodate variations from manufacturing tolerances, flight deflection and vibrations, thermal growth and the like.

In one particular construction, the end cap 40 may be formed from a first fire-resistant composite material. The first fire-resistant composite material may include a woven ceramic fabric infused with a silicone matrix material. For example, the end cap 40 may be formed from a fire-resistant composite material that includes NEXTEL® woven ceramic fabric (3M Company of St. Paul, Minn.) infused with high temperature silicone (e.g., BMS 1-74), which may include a red iron oxide component that may render the composition heat-resistant.

In another particular construction, the end cap 40 may be formed from a second (e.g., fire-resistant) composite material. One (e.g., the cap portion 44) or both the cap portion 44 and the plug portion 42 may be formed from the second composite material. The second composite material may include a woven ceramic fabric and a low friction material infused with a silicone matrix material. The low friction material may have a static coefficient of friction of at most about 0.15. One specific, non-limiting example of a low friction material is polyester fiber (or fabric). The polyester fiber/fabric may be positioned proximate the first and second major surfaces 46, 48 (FIG. 6) of the cap portion 44 of the end cap 40 to provide smooth, low-friction surfaces 46, 48 (e.g., a static coefficient of friction of at most about 0.15). Non-limiting examples of suitable polyester fibers/fabrics include DACRON® polyester fiber (Invista North America of Wichita, Kans.), NOMEX® polyester fabric (E. I. du Pont de Nemours and Company of Wilmington, Del.) and sailcloth. As one specific example, the end cap 40 may be formed from a fire-resistant composite material that includes NEXTEL® woven ceramic fabric (3M Company of St. Paul, Minn.) and DACRON® polyester fiber (Invista North America of Wichita, Kans.) infused with high temperature silicone (e.g., BMS 1-74), which may include a red iron oxide component that may render the composition heat-resistant.

In yet another particular construction, the end cap 40 may be constructed from a molded, isotropic material, such as a flexible ceramic, that is fire-resistant and smooth, low friction.

At this point, those skilled in the art will appreciate that various fire-resistant materials, including various fire-resistant composite materials, may be used to form the disclosed fire seal end cap 40. In addition to fire-resistance, material selection may additionally consider vibration wear, scrubbing of seals relative to open/close of thrust reverser, high velocity air impinging along seal, tearing, and environment, such as heat (heat embrittlement), fuel and oil.

Figure 9:
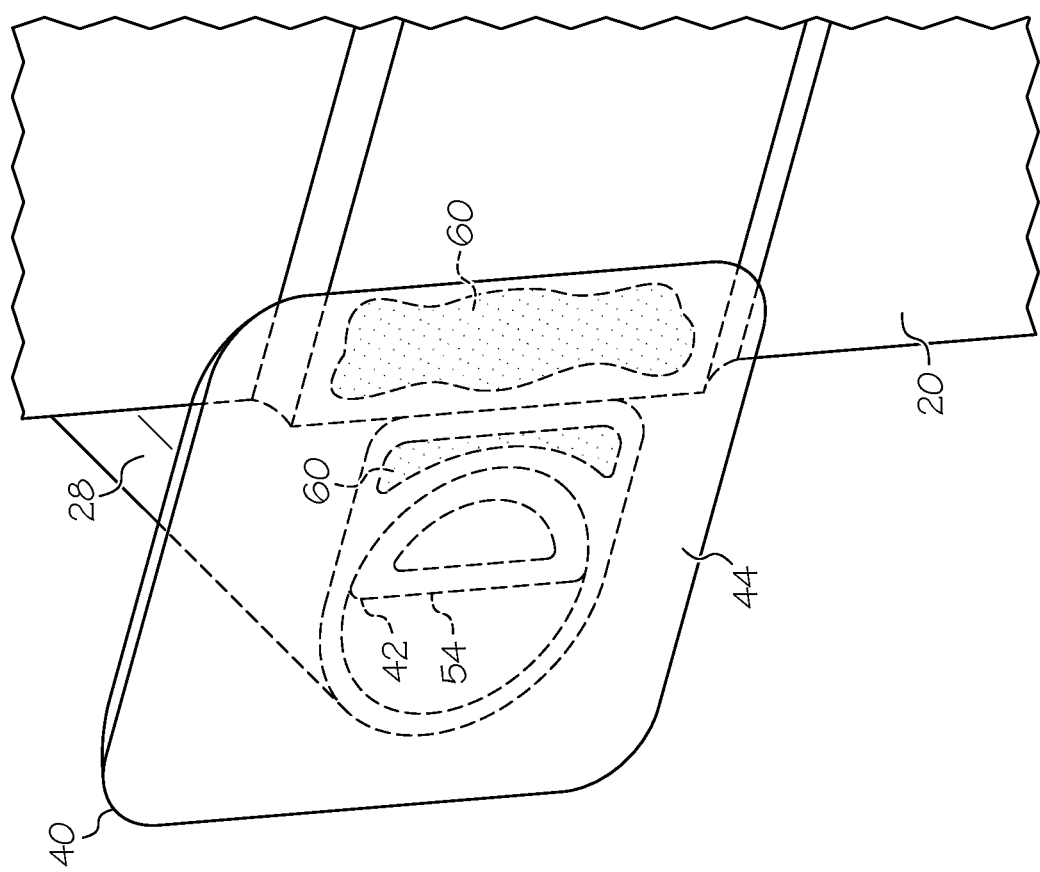
FIG. 9 is a perspective view of the fire seal end cap of FIG. 8 fully inserted into the crossover seal.

Referring to FIGS. 8 and 9, the end cap 40 may be deployed by inserting the plug portion 42 of the end cap 40 into the bore 38 of the crossover seal 28 such that the cap portion 44 of the end cap 40 overlaps both the strut box 20 and the engine fire wall 26 (FIG. 4). An adhesive 60 may be used to connect the end cap 40 to the strut box 20 and/or the crossover seal 28. For example, the adhesive 60 may connect a portion of the first major surface 46 of the cap portion 44 of the end cap 40 to a portion of the strut box 20 and to a portion of the first end 34 of the crossover seal 28. Additionally, the adhesive 60 may connect the curved rear end 56 of the plug portion 42 of the end cap 40 to a corresponding portion of the bore 38 (the bore wall) of the crossover seal 28.

The adhesive 60 may be a fire-resistant adhesive, such as RTV106 silicone adhesive available from MG Chemicals, Ltd. of Canada. Pressure clamps and heat (e.g., heat lamps) may be used to properly set the adhesive 60 and fix the end cap 40 in place. At this point, those skilled in the art will appreciate that mechanical fasteners, such as brackets, clips, rivets and the like, may be used in addition to, or as an alternative to, the adhesive 60.

Figure 11:
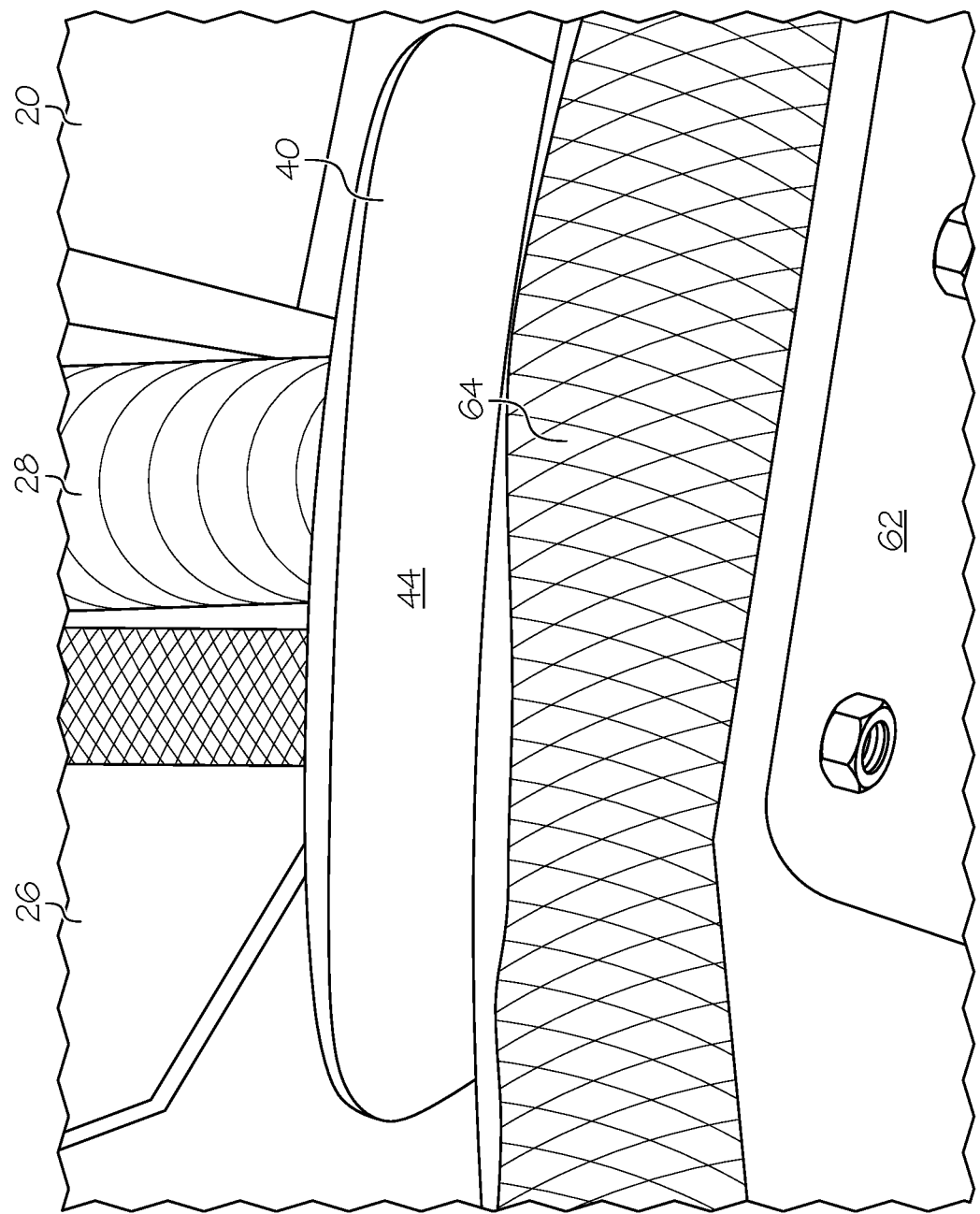
FIG. 11 is a perspective view of the disclosed multi-member assembly including a fire seal end cap.
Figure 12:
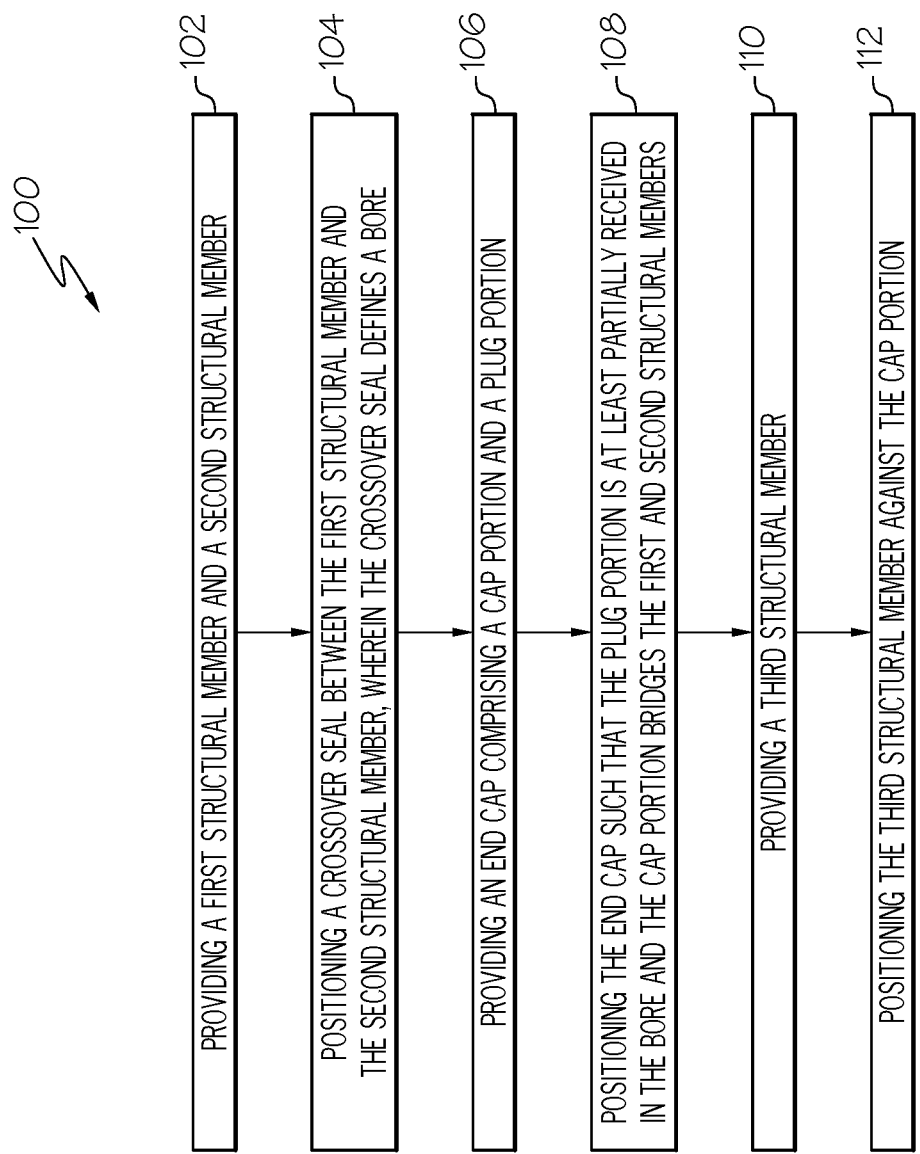
FIG. 12 is a flow chart depicting one aspect of the disclosed fire sealing method.

With the end cap 40 deployed, the cap portion 44 of the end cap 40 may bridge the interface 30 (FIG. 4) between the strut box 20 and the engine fire wall 26 without inhibiting fore/aft (FIGS. 10A and 10B), side-to-side and up/down movement of the engine fire wall 26 relative to the strut box 20. Therefore, as shown in FIG. 11, a thrust reverser 62 (a third structural member) and associated thrust reverser fire seal 64 may lie over the cap portion 44 of the end cap 40 without creating gaps.

Accordingly, the disclosed fire seal end cap 40 may facilitate a multi-member assembly (e.g., pylon, engine and thrust reverser) that is fire sealed and substantially free of gaps despite significant movement of one member (the engine) relative to the other members (pylon and thrust reverser). While a particular multi-member assembly (engine/pylon/thrust reverser) is shown and described, the disclosed fire seal end cap 40 may find application in various T-shaped seal junctions.

Also disclosed is a fire sealing method, generally designated 100. The method 100 may begin at block 102 with the step of providing a first structural member opposed from a second structural member. The first structural member may be a pylon and the second structural member may be an engine.

At block 104, a crossover seal may be positioned between the first structural member and the second structural member. The crossover seal may define a bore and may be connected to the first structural member (but may not be connected to the second structural member) to facilitate movement of the second structural member relative to the first structural member.

At block 106, an end cap may be provided. The end cap may include a cap portion and a plug portion. The plug portion may protrude from the cap portion.

At block 108, the end cap may be deployed. Specifically, the end cap may be positioned such that the plug portion is at least partially received in the bore of the crossover seal. Therefore, the cap portion may bridge the first structural member and the second structural member.

At block 110, a third structural member may be provided. For example, the third structural member may be a thrust reverser, which may include an associated thrust reverser fire seal. The third structural member may be positioned against the cap portion of the end cap (block 112), thereby providing a fire sealed multi-member assembly that is substantially free of gaps.

Referring to FIG. 13, another aspect of the disclosed fire seal end cap, generally designated 200, may include a cap portion 202, but no plug portion. Therefore, the fire seal end cap 200 may bridge the interface between the engine 16 (FIG. 1) and the pylon 18 (FIG. 1) without extending into the bore 38 (FIG. 3) defined by the crossover seal 28 (FIG. 3).

In yet another aspect, the disclosed fire seal end cap may be integral with the crossover seal (i.e., the crossover seal and the end cap may be formed as a single, monolithic body).

Although various aspects of the disclosed fire seal end cap and associated multi-member assembly and method have been shown and described, modifications may occur to those skilled in the art upon reading the specification. The present application includes such modifications and is limited only by the scope of the claims.

What is claimed is:

1. A fire seal end cap comprising:
   a cap portion defining a first major surface; and
   a plug portion having a curved rear end and a flat forward end, the plug portion protruding from said cap portion along a protrusion direction, the curved rear end corresponding to a contour of a bore for receiving the plug portion,
   wherein said cap portion and said plug portion are formed from a fire-resistant material;
   wherein said fire-resistant material is a composite material comprising a woven ceramic fabric infused with a matrix material comprising silicone;
   wherein said composite material further comprises a low friction material having a static coefficient of friction of at most 0.15;
   wherein a cross-section of said plug portion normal to said protrusion direction is D-shaped and
   wherein said protrusion direction is at a non-zero angle between 1 and 20 degrees of normal to said first major surface.

2. The fire seal end cap of claim 1 wherein said matrix material comprises a red iron oxide component.

3. The fire seal end cap of claim 1 wherein said cap portion defines a second major surface opposed from said first major surface, wherein said low friction material having said static coefficient of friction of at most 0.15 is positioned at at least one of said first major surface and said second major surface.

4. The fire seal end cap of claim 1 wherein said low friction material having said static coefficient of friction of at most 0.15 comprises polyester fiber.

5. The fire seal end cap of claim 1 wherein said plug portion and said cap portion are formed as a single monolithic body.

6. A multi-member assembly comprising:
   a first structural member;
   a second structural member opposed from, and moveable relative to, said first structural member;
   a crossover seal that comprises a body elongated to extend in a lateral direction positioned between said first structural member and said second structural member, said crossover seal defining a bore; and
   a fire seal end cap comprising:
      a cap portion defining a first major surface; and
      a plug portion protruding from said cap portion along a protrusion direction either normal to said major surface, or at a non-zero angle between 1 and 20 degrees of normal to said major surface, positioned such that said plug portion protrudes into said bore and said cap portion overlaps both said first structural member and said second structural member,
   wherein the plug portion has a curved rear end that corresponds to a contour of the bore of the crossover seal,
   wherein said lateral direction and said protrusion direction are parallel or coincide, and
   wherein a gap is defined between the crossover seal and the plug portion.

7. The multi-member assembly of claim 6 wherein said fire seal end cap is connected to said crossover seal with an adhesive.

8. The multi-member assembly of claim 6 wherein said crossover seal comprises a silicone rubber material, or a foamed material, or a foamed silicone rubber material.

9. The multi-member assembly of claim 6 wherein a cross-section of said plug portion normal to said protrusion direction is D-shaped;
   wherein said cap portion and said plug portion are formed from a fire-resistant material comprising a composite material;
   wherein said composite material further comprises a material having a static coefficient of friction of at most 0.15.

10. The multi-member assembly of claim 6 wherein said first structural member comprises a pylon of an aircraft and said second structural member comprises an engine of said aircraft.

11. The multi-member assembly of claim 6 further comprising a third structural member positioned against said cap portion.

12. The multi-member assembly of claim 11 wherein said third structural member comprises a thrust reverser of an aircraft.

13. The fire seal end cap of claim 1 wherein:
   said protrusion direction is normal to said first major surface.

14. A fire seal end cap comprising:
a rectilinear cap portion defining a first major surface;
a plug portion protruding from said cap portion along a protrusion direction either:
   a) normal to said first major surface, or
   b) at a non-zero angle between 1 and 20 degrees of normal to said first major surface;
wherein said cap portion and said plug portion are formed from a fire-resistant material;
wherein a cross-section of said plug portion normal to said protrusion direction is D-shaped and comprises a forward end and a rear end, wherein said forward end is substantially flat, and wherein said rear end corresponds to a contour of a bore for receiving the plug portion.

15. The fire seal end cap of claim 14 wherein said rear end is curved.

16. The fire seal end cap of claim 14 wherein said direction is normal to said first major surface.

17. The fire seal end cap of claim 14 wherein said plug portion protrudes from said cap portion along a protrusion direction at a non-zero angle between 1 and 20 degrees of normal to said first major surface.

18. The fire seal end cap of claim 14 wherein said cap portion further defines a second major surface opposed from said first major surface; and
further comprising a material having a static coefficient of friction of at most 0.15 positioned at at least one of said first major surface and said second major surface.

19. The fire seal end cap of claim 1 wherein said fire seal end cap is connected to a crossover seal with an adhesive.

20. The fire seal end cap of claim 6 wherein said plug portion and said cap portion are formed as a single monolithic body.

* * * * *